UNITED STATES PATENT OFFICE.

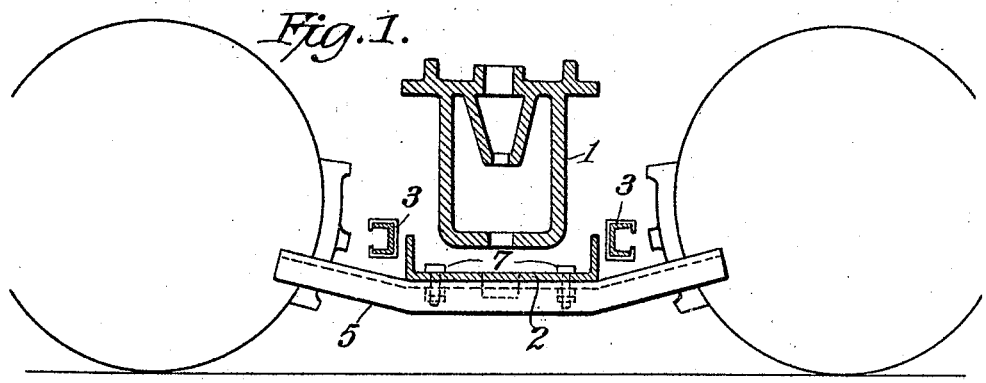
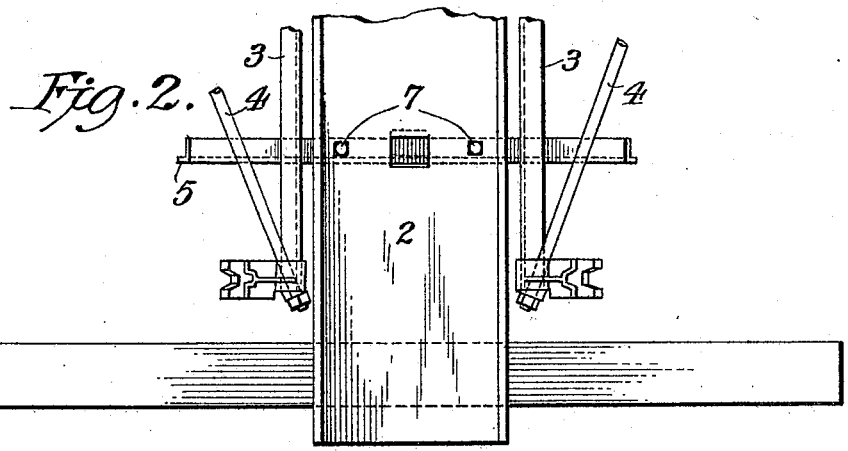
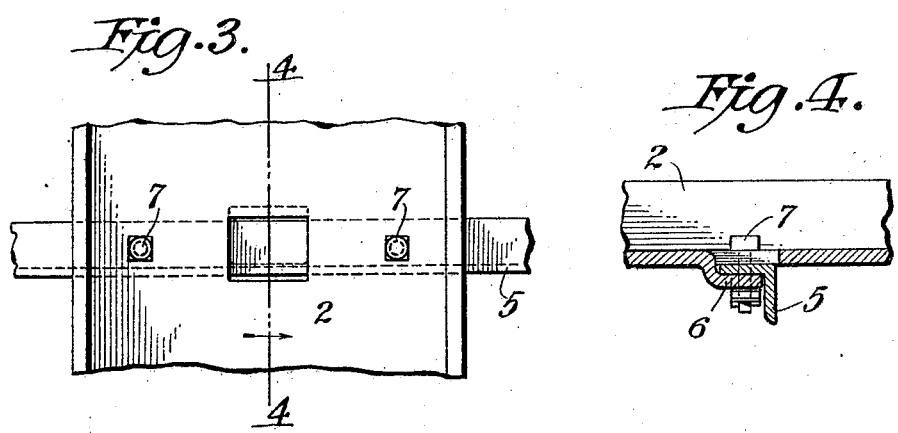
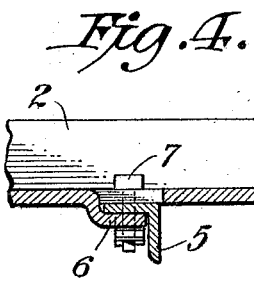

ALLEN E. OSTRANDER, OF RIDGEWOOD, NEW JERSEY, ASSIGNOR TO AMERICAN CAR AND FOUNDRY COMPANY, OF NEW YORK, N. Y., A CORPORATION OF NEW JERSEY.

BRAKE-BEAM SAFETY SUPPORT.

1,405,429.   Specification of Letters Patent.   Patented Feb. 7, 1922.

Application filed June 2, 1920. Serial No. 385,990.

*To all whom it may concern:*

Be it known that I, ALLEN E. OSTRANDER, residing at Ridgewood, Bergen County, New Jersey, and being a citizen of the United States, have invented certain new and useful Improvements in a Brake-Beam Safety Support, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Figure 1 is a side view of my improved brake beam safety support as applied to the spring plank of a truck, the truck bolster, spring plank and brake beam compression member being shown in section;

Figure 2 is a plan view of one end of the spring plank with the brake beam safety support applied;

Figure 3 is a view on a larger scale of the part of Fig. 2 that includes the brake beam safety support; and Figure 4 is a section on the line 4—4 of Fig. 3.

It is the object of my invention to provide an improved brake beam safety support that may be readily applied to car trucks now in service and that will be efficient in operation.

My invention comprises, in addition to the usual truck bolster 1, spring plank 2 and brake beams having the compression members 3 and tension members 4, an angle bar member 5 having one flange engaging over the portion 6 of the web of the channel shaped spring plank that is cut free from the web on three sides and then bent so as to lie in a plane parallel to the plane of the web but spaced therefrom sufficiently to receive the flange of the angle bar member. Bolts 7 passing through the angle bar member 5 and the web of the spring plank 2 serve to hold the member 5 in position on the portion 6 of the web. When in place, the angle bar member 5 has one flange resting on the depressed portion 6 and engaging the underside of the spring plank and the ends of the member 5 being bent upwardly, as shown in Fig. 1, pass close beneath the compression members 3 and tension members 4 of the brake beam. While but one end of the spring plank 2 is shown with a brake beam safety support attached it is to be understood that a support 5 is provided for each end of the spring plank.

What I claim is:

1. In a railway car truck, a spring plank having a portion of its web cut free on three sides and bent to lie in a plane parallel to the plane of the web and a brake beam safety support having one flange carried between said free portion and the underside of the web.

2. In a railway car truck, a spring plank having a portion of its web cut and bent to form a lug having a free end and a brake beam safety support adapted to engage said lug.

3. In a railway car truck, a spring plank having a portion of its web cut and bent to form a lug and a flanged brake beam safety support adapted to engage said lug and said spring plank, by a movement longitudinally of the spring plank.

4. In a railway car truck, a spring plank having a web, supporting lugs punched from the web and a brake beam safety support adapted to be engaged with said lugs by a movement longitudinally of the spring plank.

5. In a railway car truck, a spring plank having a web, supporting lugs, free at one end and retaining the thickness of the web, punched from said web and a brake beam safety support adapted to engage said lugs and webs.

6. In a railway car truck, a spring plank having a web, supporting lugs, free at one end and retaining the thickness of the web, punched from said web and a brake beam safety support adapted to be engaged with said lugs by a movement longitudinally of the spring plank.

7. In a railway car truck, a spring plank having lugs integral therewith and a brake beam safety support adapted to be engaged with said lugs by a movement longitudinally of the spring plank.

In witness whereof I have hereunto set my hand in the presence of two witnesses.

ALLEN E. OSTRANDER.

Witnesses:
LEO V. JOYCE,
BESSIE D. STRONG.